(12) United States Patent
Kanda

(10) Patent No.: US 9,115,759 B2
(45) Date of Patent: Aug. 25, 2015

(54) ROLLER BEARING

(75) Inventor: Yutaka Kanda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/002,217

(22) PCT Filed: Jul. 13, 2012

(86) PCT No.: PCT/JP2012/068006
§ 371 (c)(1),
(2), (4) Date: Aug. 29, 2013

(87) PCT Pub. No.: WO2013/011963
PCT Pub. Date: Jan. 24, 2013

(65) Prior Publication Data
US 2013/0336610 A1   Dec. 19, 2013

(30) Foreign Application Priority Data

Jul. 15, 2011  (JP) .................. 2011-156750
Jul. 15, 2011  (JP) .................. 2011-156751
Jun. 1, 2012   (JP) .................. 2012-126481

(51) Int. Cl.
*F16C 33/36* (2006.01)
*F16C 33/58* (2006.01)
(Continued)

(52) U.S. Cl.
CPC .............. *F16C 33/36* (2013.01); *B60B 35/02* (2013.01); *F16C 19/386* (2013.01); *F16C 33/366* (2013.01); *F16C 25/08* (2013.01); *F16C 2240/70* (2013.01); *F16C 2240/80* (2013.01)

(58) Field of Classification Search
CPC ............. F16C 2240/40; F16C 2240/70; F16C 2240/80; F16C 2240/82; F16C 19/364; F16C 33/36; F16C 33/366; F16C 25/08

USPC .................. 384/571, 574, 564, 450
See application file for complete search history.

(56) References Cited

U.S. PATENT DOCUMENTS 2,267,708 A * 12/1941 Cox ............................ 384/574
3,144,284 A *  8/1964 Ortegren ..................... 384/574
(Continued)

FOREIGN PATENT DOCUMENTS

JP    2002-48146 A   2/2002
JP    2002-188649 A  7/2002
(Continued)

OTHER PUBLICATIONS

Machine Translation of JP 2010-025155 dated Apr. 2, 2010.*
(Continued)

*Primary Examiner* — Alan B Waits
(74) *Attorney, Agent, or Firm* — Sughrue Mion, PLLC

(57) ABSTRACT

A tapered roller bearing (1a, 1b) satisfies the following three conditions: (a1) $0.8 \leq Hi/Dw \leq 1.2$, (b1) $1.01 \leq dm/dh \leq 1.05$, and (c1) $2.1 \leq L/Dw \leq 3.0$, where a pitch circle diameter at a center of a roller length along an axis line (X) of each tapered roller (4) is (dm), the radial dimension of the inner ring (2) at an intersection of the inner ring raceway (2a) and a perpendicular line (v) extending from a position of the pitch circle diameter in a direction perpendicular to the axis line is the thickness (Hi) of the inner ring, a cross-sectional center diameter of the roller bearing is (dh), the length of the tapered roller (4) is the length (L) of the tapered roller, and a half of the sum of the large diameter dimension and the small diameter dimension of the tapered roller (4) is the diameter (Dw) of the tapered roller.

6 Claims, 7 Drawing Sheets

(51) Int. Cl.
  *F16C 19/36* (2006.01)
  *B60B 35/02* (2006.01)
  *F16C 19/38* (2006.01)
  *F16C 25/08* (2006.01)

(56) References Cited

U.S. PATENT DOCUMENTS

| | | | |
|---|---|---|---|
| 3,586,407 A * | 6/1971 | Schweitzer | 384/574 |
| 3,644,006 A * | 2/1972 | Feuillat et al. | 384/560 |
| 4,904,094 A * | 2/1990 | Furumura et al. | 384/492 |
| 6,464,398 B2 * | 10/2002 | Takehara et al. | 384/450 |
| 6,860,640 B2 * | 3/2005 | Matsuyama et al. | 384/571 |
| 8,157,453 B2 * | 4/2012 | Ohtsuki et al. | 384/589 |
| 2002/0051594 A1 | 5/2002 | Takehara et al. | |
| 2002/0086754 A1 | 7/2002 | Fukuwaka et al. | |
| 2004/0017957 A1 * | 1/2004 | Matsuyama et al. | 384/571 |
| 2008/0037924 A1 * | 2/2008 | Zeidlhack | 384/574 |
| 2009/0003745 A1 * | 1/2009 | Tsujimoto | 384/450 |
| 2009/0116779 A1 | 5/2009 | Komori et al. | |

FOREIGN PATENT DOCUMENTS

| | | |
|---|---|---|
| JP | 2002-349582 A | 12/2002 |
| JP | 2005-195152 A | 7/2005 |
| JP | 2006-322579 A | 11/2006 |
| JP | 2008-2608 A | 1/2008 |
| JP | 2010-25155 A | 2/2010 |

OTHER PUBLICATIONS

Search Report dated Aug. 28, 2012 issued in International Application No. PCT/JP2012/068006 (PCT/ISA/210).
Written Opinion dated Aug. 28, 2012 issued in International Application No. PCT/JP2012/068006 (PCT/ISA/237).

* cited by examiner

ROLLER BEARING

TECHNICAL FIELD

The present invention relates to a roller bearing, and more particularly, to a roller bearing being used for outer-ring rotation in the wheels of heavy dump trucks, mine/construction dump trucks, wheel loaders, etc., and in planetary gears for general industrial machinery, etc.

BACKGROUND ART

Conventionally, as roller bearings for ratably supporting the wheels of a heavy vehicle on the suspension system thereof, taper roller bearings having a large load capacity and high rigidity have been used favorably. In this kind of taper roller bearing, the outer ring is usually press-fitted into a housing with an interference and secured thereto, and the inner ring is secured to a shaft member with a very small clearance or an interference to prevent relative rotation therebetween; however, a creep phenomenon may occur in which the relative rotation therebetween is caused, for example, due to the change in load associated with the movement of the rolling elements. In particular, in a roller bearing being used under an outer-ring rotation load condition, in the case that the roller bearing is used under a heavy load condition in which P/C (P: bearing load, C: basic dynamic load rating) is more than 0.13, a creep phenomenon may occur at the inner ring serving as a stationary ring. This creep phenomenon may occur not only in taper roller bearings, but also in cylindrical roller bearings and spherical roller bearings being used under outer-ring rotation load conditions, such as in planetary gears for general industrial machinery.

While studying the creep phenomenon, the present inventors have found that the creep phenomenon is caused by the fact that when a heavy load is applied to a bearing, loads on the rolling elements thereof are increased, and local expansion and contraction on the surface of the inner ring raceway are increased at the time when the rolling elements pass.

More specifically, in the case that one point in the loaded area on the surface of the inner ring raceway is viewed, in a state in which a rolling element is placed on the surface of the inner ring raceway, the inner ring contracts in the radial direction and expands in the circumferential direction due to the load on the rolling element, and after the rolling element has passed, the inner ring returns to its original shape. Hence, each time each rolling element passes, the inner ring repeatedly expands and contracts in the circumferential direction, thereby causing a creep phenomenon in which the inner ring rotates with respect to the shaft. If this creep phenomenon is generated, wear occurs on the surface of the shaft, and abrasion powder on the surface gets into the bearing, thereby causing premature flaking.

It is conceivable to increase the interference of the shaft to suppress the creep phenomenon under the heavy load condition.

Furthermore, in the rolling element described in Patent Document 1, on the surface to be fitted on a mating member, a relief groove is formed in the stationary ring within a range not exceeding the width of the groove on the raceway surface. With this configuration, even if the raceway of the bearing is deformed elastically due to the passing of the rolling element, the elastic deformation is not transmitted to the mating member because the stationary ring is not made contact with the mating member, whereby the creep phenomenon can be suppressed.

Moreover, in the roller bearing described in Patent Document 2, the creep phenomenon is prevented by increasing the thicknesses of the inner ring and the outer ring.

PRIOR ART DOCUMENT

Patent Document

Patent Document 1: JP-A-2006-322579
Patent Document 2: JP-A-2010-025155

SUMMARY OF THE INVENTION

Problem that the Invention is to solve

However, with respect to the change in the interference of the shaft, in the case that the interference is increased, shrinkage fit or the like is required at the time of the installation of the bearing, and the productivity is lowered significantly.

In addition, in the roller bearing described in Patent Document 1, a process for forming the relief groove is additionally required, thereby increasing the production cost. Furthermore, the range of the contact with the mating member is reduced extremely, and the surface pressure at the contact section is increased, thereby causing a problem in which the mating member is damaged and worn.

Moreover, in the roller bearing described in Patent Document 2, since the thicknesses of the inner ring and the outer ring are increased, the diameter of the roller becomes extremely small, thereby causing a problem in which the bearing life is shortened and the bearing rigidity is reduced. Hence, when the bearing is used, the size of the bearing is required to be made larger to satisfy the required life and the required rigidity, and this causing a problem of raising the production cost of the entire apparatus.

In consideration of the above-mentioned circumstances, an object of the present invention is to provide a roller bearing being used for outer-ring rotation and capable of suppressing a creep phenomenon from occurring in the inner ring without carrying out special processing and without lowering the bearing rigidity.

Means for Solving the Problem

The above object of the present invention is achieved with the following structures.

(1) A roller bearing being used for outer-ring rotation, comprising:
an inner ring having a tapered inner ring raceway on an outer peripheral surface thereof;
an outer ring having a tapered outer ring raceway on an inner peripheral surface thereof; and
a plurality of tapered rollers rotatably provided between the inner ring raceway and the outer ring raceway,
wherein the roller bearing satisfies the following three conditions:

$$0.8 \leq Hi/Dw \leq 1.2, \tag{a1}$$

$$1.01 \leq dm/dh \leq 1.05, \text{ and} \tag{b1}$$

$$2.1 \leq L/Dw \leq 3.0 \tag{c1}$$

where a pitch circle diameter at a center of a roller length along an axis line of each tapered roller is dm,
the radial dimension of the inner ring at an intersection of the inner ring raceway and a perpendicular line extending from a position of the pitch circle diameter in a direction perpendicular to the axis line is the thickness Hi of the inner ring, a cross-sectional center diameter of the roller bearing is dh, the length of the tapered roller is the length L of the tapered roller, and a half of the sum of the large diameter dimension and the small diameter dimension of the tapered roller is the diameter Dw of the tapered roller.

(2) The roller bearing according to the clause (1), wherein the roller bearing further satisfies a condition represented by Dw/dm≤S/dm≤0.11, where a distance between the adjacent tapered rollers is S.

(3) The roller bearing according to clause (1) or (2), wherein at least the inner ring is subjected to carburizing or carbonitriding, and the inner ring is made of carbon steel containing 0.1 to 0.7 wt % of carbon and the amount of retained austenite in a surface layer of the inner ring raceway is 20 to 45 vol %.

(4) The roller bearing according to any one of clause (1) to (3), further comprising:

a pair of annular plates disposed so as to sandwich the tapered rollers in a longitudinal direction of the tapered rollers; and a connection member for connecting the pair of annular plates, wherein each of the tapered roller has dents at centers of both end faces thereof, and the pair of annular plates has pins which are fitted into the dents of the end faces of each tapered roller so as not to interrupt the rotation of each tapered roller.

(5) A roller bearing being used for outer-ring rotation, comprising:

an inner ring having an inner ring raceway on an outer peripheral surface thereof;

an outer ring having an outer ring raceway on an inner peripheral surface thereof; and a plurality of cylindrical rollers rotatably provided between the inner ring raceway and the outer ring raceway, wherein the roller bearing satisfies the following two conditions:

$$0.6 \leq Hi/Dw \leq 1.8, \text{ and} \tag{a2}$$

$$1.01 \leq dm/dh \leq 1.15, \tag{b2}$$

where a pitch circle diameter of the respective cylindrical rollers is dm, the thickness of the inner ring is Hi, and a cross-sectional center diameter of the roller bearing is dh, and the diameter of the cylindrical roller is Dw.

(6) The roller bearing according to clause (5), wherein at least the inner ring is subjected to carburizing or carbonitriding, and the inner ring is made of carbon steel containing 0.1 to 0.7 wt % of carbon and the amount of retained austenite in a surface layer of the inner ring raceway is 20 to 45 vol %.

(7) A roller bearing being used for outer-ring rotation, comprising:

an outer ring having an outer ring raceway on an inner peripheral surface thereof, wherein the outer ring raceway has a spherical concave surface having a single center;

an inner ring having a pair of inner ring raceways on an outer peripheral surface thereof, wherein the pair of inner ring raceways are opposed to the outer ring raceway; and a plurality of spherical rollers rotatably provided in two rows between the outer ring raceway and the pair of inner ring raceways, wherein the roller bearing satisfies the following two conditions:

$$0.8 \leq Hi/Dw \leq 2.0, \text{ and} \tag{a3}$$

$$1.01 \leq dm/dh \leq 1.15, \tag{b3}$$

where a pitch circle diameter at a center of a roller length along an axis line of each spherical roller is dm, the radial dimension of the inner ring at an intersection of the inner ring raceway and a perpendicular line extending from a position of the pitch circle diameter in a direction perpendicular to the axis line is the thickness Hi of the inner ring, a cross-sectional center diameter of the roller bearing is dh, and a maximum diameter dimension of the spherical roller is Dw.

(8) The roller bearing according to clause (7), wherein at least the inner ring is subjected to carburizing or carbonitriding, and the inner ring is made of carbon steel containing 0.1 to 0.7 wt % of carbon and the amount of retained austenite in a surface layer of the inner ring raceway is 20 to 45 vol %.

Advantage of the Invention

With the roller bearing described in clause (1) of the present invention, the ratio Hi/Dw between the thickness Hi of the inner ring and the diameter Dw of the tapered roller is 0.8≤Hi/Dw≤1.2, the ratio dm/dh between the pitch circle diameter dm and the cross-sectional center diameter dh of the roller bearing is 1.01≤dm/dh≤1.05, and the ratio L/Dw between the length L of the tapered roller and the diameter Dw of the tapered roller is 2.1≤L/Dw≤3.0; hence, the basic static load rating is increased and the rigidity of the inner ring is raised, whereby the elastic deformation of the inner ring due to the passing of the rolling elements can be decreased and a creep phenomenon can be suppressed.

For this reason, in comparison with the conventional taper roller bearing wherein the ratio Hi/Dw between the thickness Hi of the inner ring and the diameter Dw of the tapered roller is 0.4≤Hi/Dw≤0.6, the ratio dm/dh between the pitch circle diameter dm and the cross-sectional center diameter dh of the taper roller bearing is 0.97≤dm/dh≤1.01, and the ratio L/Dw between the length L of the tapered roller and the diameter Dw of the tapered roller is 1.0≤L/Dw≤2.0, the basic static load rating of the tapered roller according to the present invention is increased and the rigidity of the tapered roller itself is raised, whereby the deformation of the inner ring is suppressed, thereby suppressing creep.

In addition, with the roller bearing described in clause (2) of the present invention, the ratio S/dm between the distance S between the adjacent tapered rollers and the pitch circle diameter dm is Dw/dm≤S/dm≤0.11; hence, the number of the tapered rollers is increased, the load on each tapered roller is decreased, and the surface pressure on the surface of the inner ring raceway is decreased, whereby the elastic deformation of the inner ring can be further suppressed.

In the case that the number of the rolling elements is increased and the distance between the rollers is reduced, the width of the pillars of the cage is reduced, and the cage may be broken; however, in the present invention, the diameter of the roller is made smaller and the weight of the roller is reduced, and the loads exerted on the pillar sections of the cage are decreased. As a result, the width of the pillars of the cage can be made smaller than that of the conventional product, and the distance between the rollers can also be made smaller than usual.

Furthermore, since the tapered rollers are made closer to each other, the elongations on the surface of the inner ring raceway in the circumferential direction due to the loads on the tapered rollers are cancelled with each other, and the creep phenomenon can be suppressed.

Moreover, with the roller bearing described in clause (3) of the present invention, since the diameter of the roller is made smaller, the bearing life becomes shorter than that of the conventional taper roller bearing; however, this lowering of the bearing life can be compensated for and the bearing life can be made equal to or more than that of the conventional taper roller bearing.

Besides, with the roller bearing described in clause (4) of the present invention, since a hole through which a pin passes is not required to be provided in the tapered roller, roller breakage can be prevented even if the roller diameter is made smaller.

What's more, with the roller bearing described in clause (5) of the present invention, the ratio Hi/Dw between the thickness Hi of the inner ring and the diameter Dw of the cylindrical roller is $0.6 \leq Hi/Dw \leq 1.8$ and the ratio dm/dh between the pitch circle diameter dm and the cross-sectional center diameter dh of the roller bearing is $1.01 \leq dm/dh \leq 1.15$; hence, the rigidity of the inner ring is raised and the elastic deformation of the inner ring due to the passing of the rolling elements can be decreased, whereby the creep phenomenon can be suppressed.

Additionally, with the roller bearing described in clause (6) of the present invention, since the diameter of the roller is made smaller, the bearing life becomes shorter than that of the conventional cylindrical roller bearing; however, this lowering of the bearing life can be compensated for and the bearing life can be made equal to or more than that of the conventional cylindrical roller bearing.

Still further, with the roller bearing described in clause (7) of the present invention, the ratio Hi/Dw between the thickness Hi of the inner ring and the diameter Dw of the spherical roller is $0.8 \leq Hi/Dw \leq 2.0$ and the ratio dm/dh between the pitch circle diameter dm and the cross-sectional center diameter dh of the roller bearing is $1.01 \leq dm/dh \leq 1.15$; hence, the rigidity of the inner ring is raised and the elastic deformation of the inner ring due to the passing of the rolling elements can be decreased, whereby the creep phenomenon can be suppressed.

More and more, with the roller bearing described in clause (8) of the present invention, since the diameter of the roller is made smaller, the bearing life becomes shorter than that of the conventional spherical roller bearing; however, this lowering of the bearing life can be compensated for and the bearing life can be made equal to or more than that of the conventional spherical roller bearing.

MODES FOR CARRYING OUT THE INVENTION

Figure 1:
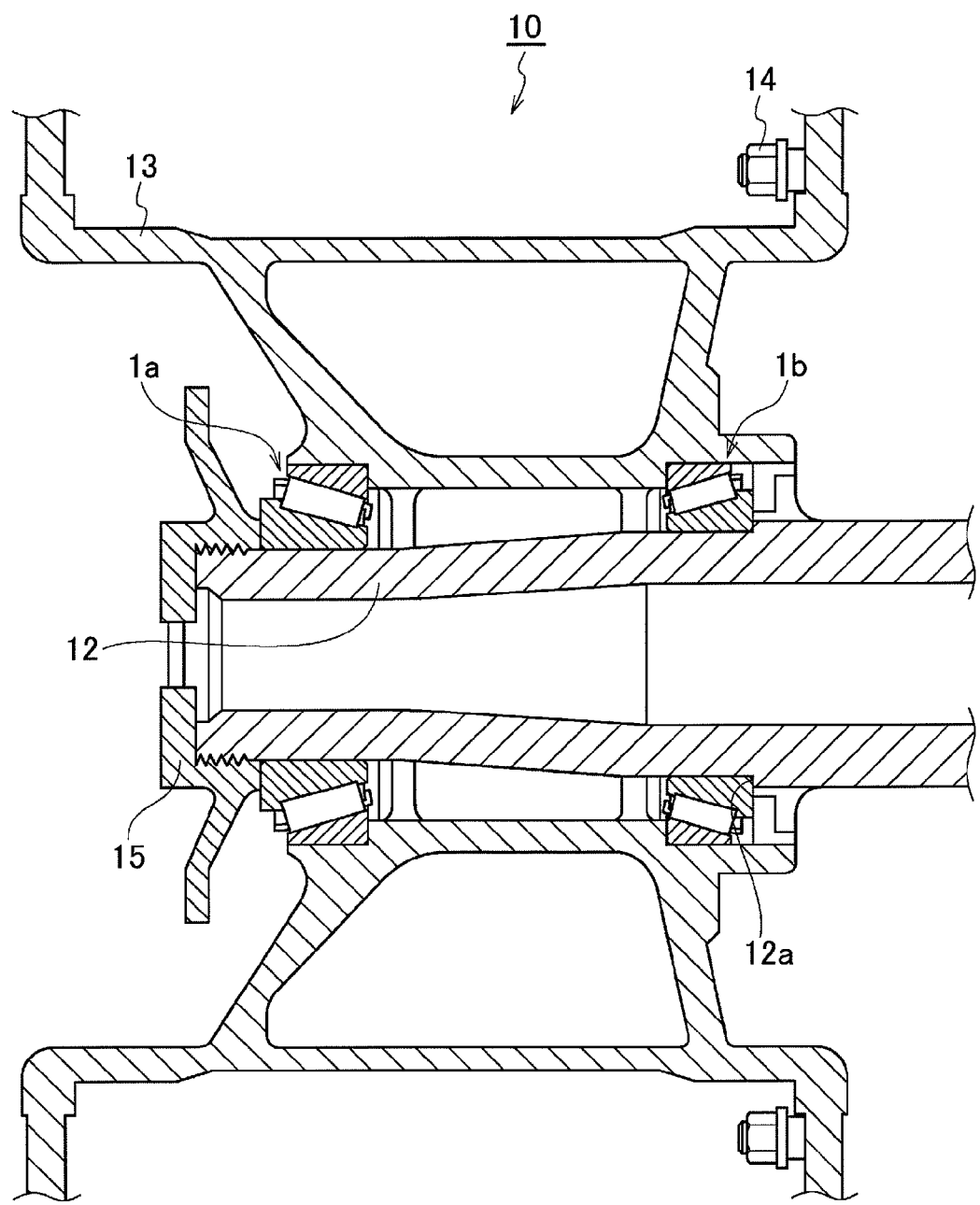
FIG. 1 is a cross-sectional view showing a case in which taper roller bearings according to a first embodiment of the present invention are applied to a wheel support apparatus.

Roller bearings according to respective embodiments of the present invention will be described below in detail referring to the drawings.

First Embodiment

Figure 2:
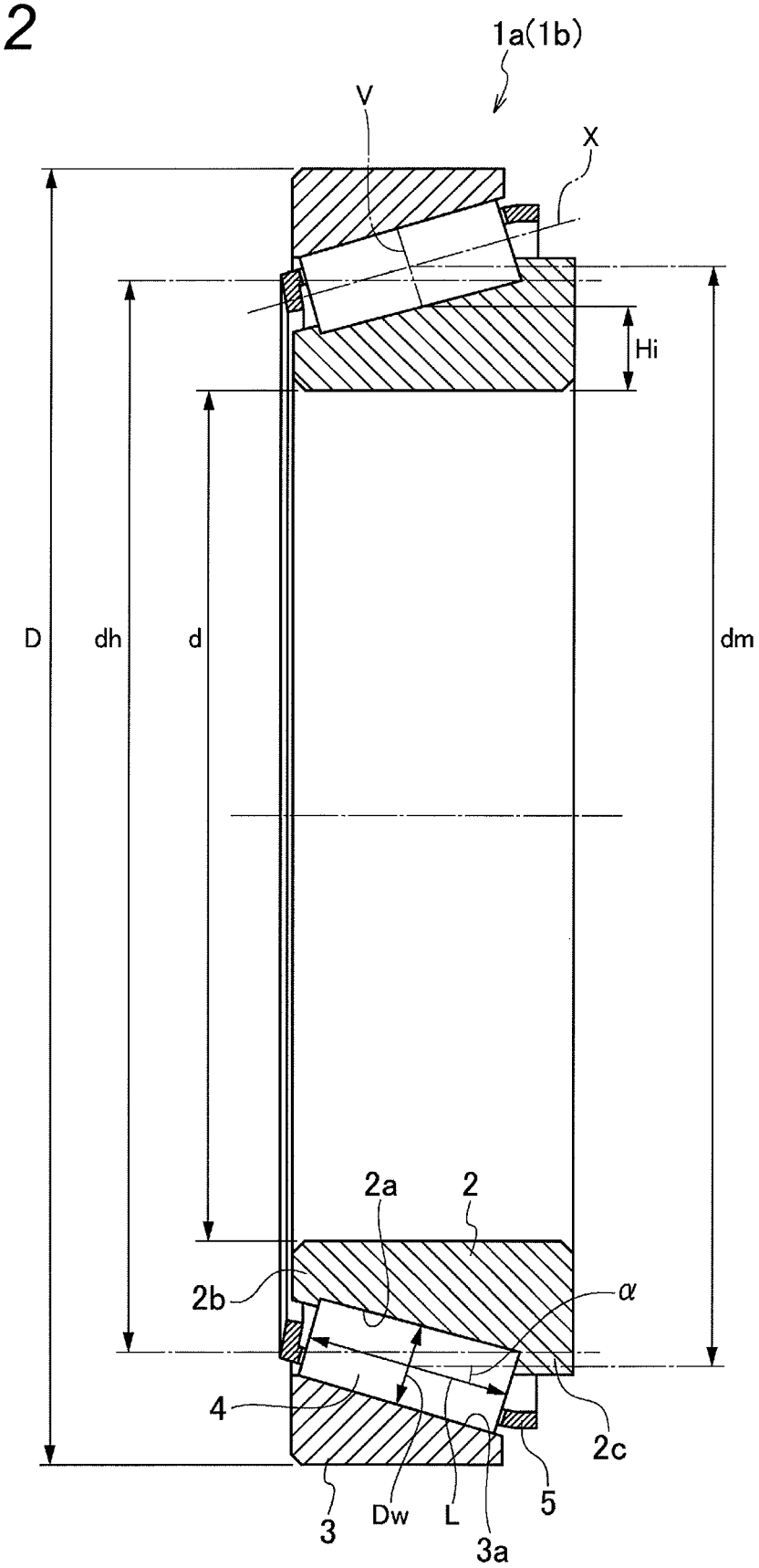
FIG. 2 is an axially cross-sectional view showing the taper roller bearing shown in FIG. 1.
Figure 3:
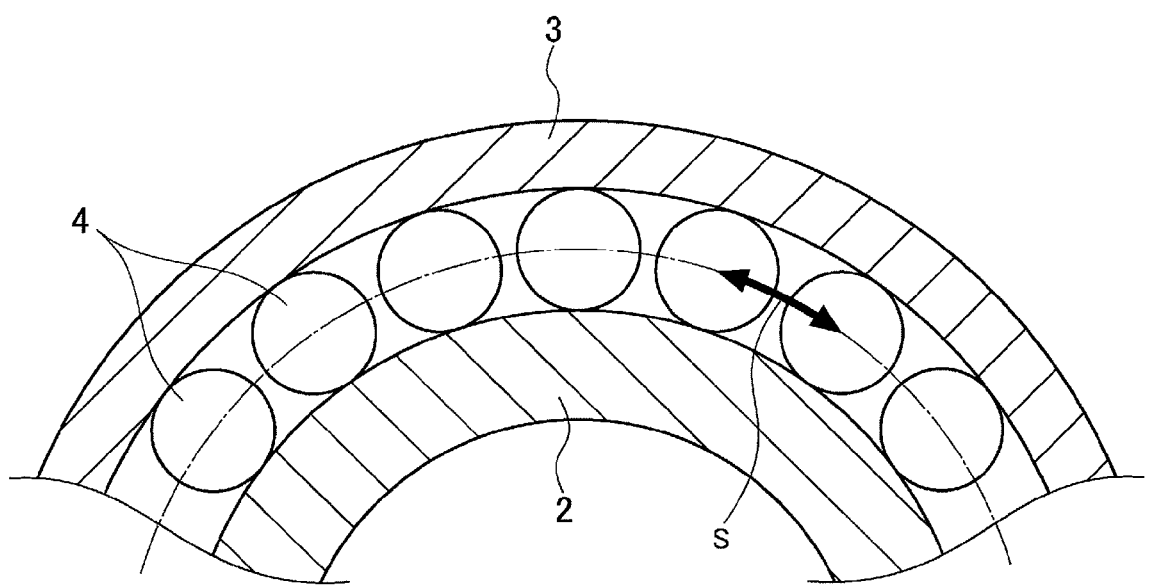
FIG. 3 is a fragmentary cross-sectional view showing the taper roller bearing shown in FIG. 1 in the direction orthogonal to the axis thereof.

FIG. 1 is a cross-sectional view showing a case in which taper roller bearings according to a first embodiment of the present invention are applied to a wheel support apparatus, and FIG. 2 is an axially cross-sectional view showing the taper roller bearing, and FIG. 3 is a fragmentary cross-sectional view showing the taper roller bearing in the direction orthogonal to the axis thereof.

In a wheel support apparatus 10, a pair of taper roller bearings 1a and 1b is disposed between the outer peripheral surface of a shaft member 12 and the inner peripheral surface of a housing 13. The brake drum (not shown) of a braking apparatus and the wheel disc (not shown) of a wheel are installed on the housing 13 using stud bolts 14.

As shown in FIGS. 1 and 2, each of the taper roller bearings 1a and 1b is equipped with an inner ring 2, an outer ring 3, a plurality of tapered rollers 4, and a cage 5. The inner ring 2 has a tapered inner ring raceway 2a on the outer peripheral surface thereof and has a small-diameter side rib section 2b and a large-diameter side rib section 2c on both sides of the inner ring raceway 2a, and the outer ring 3 has a tapered outer ring raceway 3a on the inner peripheral surface thereof. The plurality of tapered rollers 4 are rotatably provided between the inner ring raceway 2a and the outer ring raceway 3a using the cage 5. A contact angle in the range of the contact angles of the known taper roller bearings is applied to the contact angle α of the tapered roller 4. Furthermore, the taper roller bearings 1a and 1b are almost the same in shape; although the bearings being different in size are used in this embodiment, bearings having the same size may also be used.

Moreover, the respective outer rings 3 are fitted in the housing 13, the inner ring 2 of the taper roller bearing 1b on the inboard side is butted against the stepped section 12a of the shaft member 12, and the inner ring 2 of the taper roller bearing 1a on the outboard side is secured by tightening an inner ring holding section 15 provided on the side thereof using a nut or a bolt. As a result, each inner ring 2 is pressed in the axial direction and in a direction in which the distance between the inner ring raceway 2a and the outer ring raceway 3a is reduced, whereby a preload is applied to each tapered roller 4.

Although carburizing steel is usually used as the material of the tapered roller 4, high carbon chrome bearing steel (SUJ) may also be used. Furthermore, although a pressed cage or a pin type cage is usually used, a polyphenylene sulfide resin (PPS resin) or a straight polyphenylene sulfide resin (Lw-PPS resin) may also be used as the material of the cage 5. In particular, a composition wherein 10 to 20 wt % of glass fiber is contained in a high-molecular-weight straight polyphenylene sulfide resin having a melting temperature of 310° C. and 700 poise or more at a shear velocity of 200/sec or a composition containing 77.0 to 97.0 wt % of a straight polyphenylene sulfide resin, 1.0 to 20 wt % of glass fiber, and 2.0 to 3.9 wt % of an oligomer having perfluoroalkyl and alkyl groups is preferably used as the straight polyphenylene sulfide resin. Since the cage 5 made as described above is used, the cage can be tolerated in long-term use under severe usage conditions, such as high temperature, high-speed rotation and high load conditions.

The cage 5 shown in FIG. 2 as an example is a press-molded metallic cage in which a small-diameter side annular section and a large-diameter side annular section are connected to each other using a plurality of pillar sections disposed in the circumferential direction at predetermined intervals, and the tapered roller 4 is held in a pocket formed by the small-diameter side annular section and the large-diameter side annular section and the pillar sections adjacent to each other.

As shown in FIGS. 2 and 3, it is herein assumed that the pitch circle diameter at the center of the roller length along the axis line x of each tapered roller 4 is dm, that the radial dimension of the inner ring 2 at the point where a perpendicular line v extending perpendicularly with respect to the axis line x from the position of the pitch circle diameter intersects with the inner ring raceway 2a is the thickness Hi of the inner ring, that the cross-sectional center diameter of the taper roller bearing is dh, that the length of the tapered roller 4 is the length L of the tapered roller, that ½ of the sum of the large diameter dimension and the small diameter dimension of the tapered roller is the diameter Dw of the tapered roller, and that the distance between the adjacent tapered rollers 4 is S.

The diameter of the cylindrical surface obtained by connecting the middle points of the roller lengths along the axis lines x of the plurality of tapered rollers 4 disposed inside the space between the inner ring raceway 2a and the outer ring raceway 3a is referred to as the pitch circle diameter of the tapered roller 4, and the pitch circle diameter has the same value, regardless of whether any tapered rollers 4 are used. Furthermore, when it is assumed that the inside diameter (the dimension of the inner peripheral diameter of the inner ring) of the taper roller bearing is d and that the outside diameter (the dimension of the outer peripheral diameter of the outer ring) is D, the cross-sectional center diameter dh of the taper roller bearing is represented by (D+d)/2.

When it is assumed that the number of the tapered rollers 4 (also referred to as the number of rolling elements) is Z, the distance S between the adjacent tapered rollers 4, i.e., a distance on the pitch circle diameter, is represented by the following calculation expression (1).

$$S=(360/Z)\cdot(\pi c/180)\cdot dm/2 \quad (1)$$

In this case, the taper roller bearings 1a and 1b according to this embodiment have been set to satisfy all the following three conditions: (a1) the ratio Hi/Dw between the thickness Hi of the inner ring and the diameter Dw of the tapered roller is $0.8 \leq Hi/Dw \leq 1.2$, (b1) the ratio dm/dh between the pitch circle diameter dm and the cross-sectional center diameter dh of the taper roller bearing is $1.01 \leq dm/dh \leq 1.05$, and (c1) the ratio L/Dw between the length L of the tapered roller and the diameter Dw of the tapered roller is $2.1 \leq L/Dw \leq 3.0$.

As described above, in the taper roller bearings 1a and 1b according to this embodiment, the thickness of the inner ring 2 is increased and the rigidity of the inner ring 2 is raised, instead of increasing the interference of a shaft, whereby the deformation of the inner ring 2 is suppressed, thereby suppressing creep.

Furthermore, in the taper roller bearings 1a and 1b according to this embodiment, the ratio S/dm between the distance S (refer to FIG. 3) between the adjacent tapered rollers and the pitch circle diameter dm is set to satisfy $Dw/dm \leq S/dm \leq 0.11$.

With this configuration, the number of the tapered rollers 4 is increased, the load on each tapered roller 4 is decreased, and the surface pressure on the inner ring raceway 2a is decreased, whereby the elastic deformation of the inner ring 2 can be suppressed. Moreover, since the tapered rollers 4 are placed closer to each other, the elongations of the inner ring raceway 2a in the circumferential direction due to the loads on the tapered rollers 4 are cancelled with each other, whereby a creep phenomenon can be suppressed.

In the case that the distance between the adjacent tapered rollers 4 is reduced, the width of the pillars of the cage is reduced, and the cage 5 may be broken; however, in the present invention, since the diameter Dw of the tapered roller is made smaller and the weight of the tapered roller is reduced as described above, the loads exerted on the pillar sections of the cage are decreased. As a result, the width of the pillars of the cage can be made smaller than usual, and the distance between the adjacent tapered rollers 4 can be made smaller than usual.

Since the diameter of the roller is made smaller, the bearing life becomes shorter; in the case that an appropriate bearing life is desired to be obtained securely, it is preferable that at least the inner ring is made of carbon steel containing 0.1 to 0.7 wt % of carbon and is subjected to carburizing or carbonitriding so that the amount of retained austenite in the surface layer of the raceway is 20 to 45 vol %.

Second Embodiment

In the first embodiment described above, the metallic cage integrally formed by press-molding is used as an example; however, in a second embodiment, the end face shape of the tapered roller and the configuration of the cage are different from those of the taper roller bearing according to the first embodiment, and the other configurations are identical or equivalent to those of the taper roller bearing according to the first embodiment. Although the taper roller bearing according to the second embodiment is described below, the components identical or equivalent to those of the taper roller bearing according to the first embodiment are designated by identical or equivalent reference codes and their descriptions are omitted.

Figure 4A:
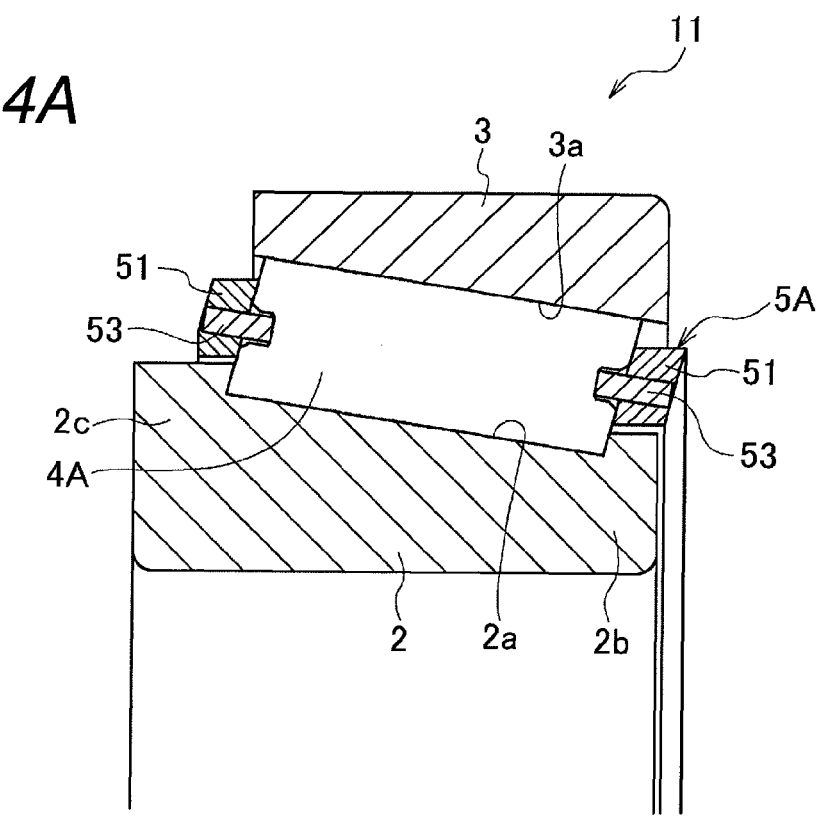
FIG. 4A is an axially cross-sectional view showing a taper roller bearing according to a second embodiment.

As shown in FIG. 4A, a taper roller bearing 11 is equipped with an inner ring 2, an outer ring 3, a plurality of tapered rollers 4A, and a cage 5A. The inner ring 2 has a tapered inner ring raceway 2a on the outer peripheral surface thereof and has a small-diameter side rib section 2b and a large-diameter side rib section 2c on both sides of the inner ring raceway 2a, and the outer ring 3 has a tapered outer ring raceway 3a on the inner peripheral surface thereof. The plurality of tapered rollers 4A are rotatably provided between the inner ring raceway 2a and the outer ring raceway 3a using the cage 5A.

The tapered roller 4A has dents at the centers of both end faces thereof.

Figure 5:
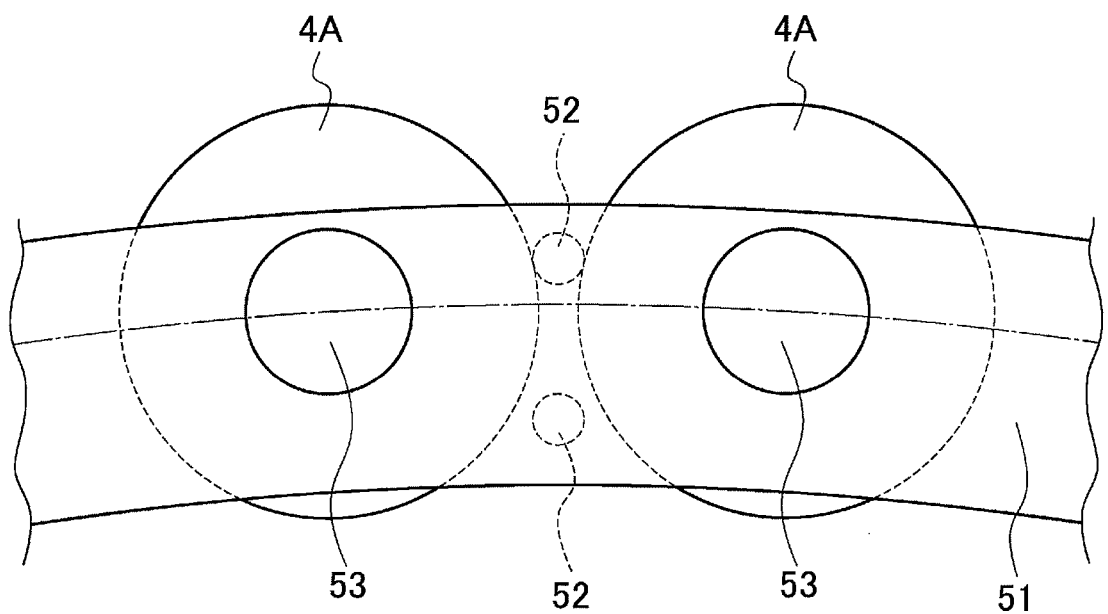
FIG. 5 is a view showing tapered rollers and end face plates to be incorporated in the taper roller bearing according to the second embodiment, viewed from the side of the end face plate.

As also shown in FIG. 5, the cage 5A is equipped with a pair of annular plates 51 disposed so as to hold the tapered rollers 4A therebetween in the longitudinal direction and stays 52 serving as connection members for connecting the pair of annular plates 51. Pins 53 to be fitted into the dents of the end faces so as not to interrupt the rotation of the tapered roller 4A are formed in the pair of annular plates 51.

The stays 52 are formed so as to have a diameter smaller than that of the tapered roller 4A and are disposed above and below the pitch circle diameter with a predetermined distance provided therebetween in the radial direction. However, it may be possible that the stays 52 are not disposed between the respective tapered rollers 4A, but disposed between every several tapered rollers in consideration of strength. The stays 52 and the pins 53 are secured to the annular plates 51 by any suitable means, such as welding, press-fitting and adhesion. In addition, it is preferable that the roughness at the contact sections between the dents of the tapered roller 4A and the pins should be as small as possible and the contact sections should be coated with manganese phosphate or the like for wear prevention.

Figure 4B:
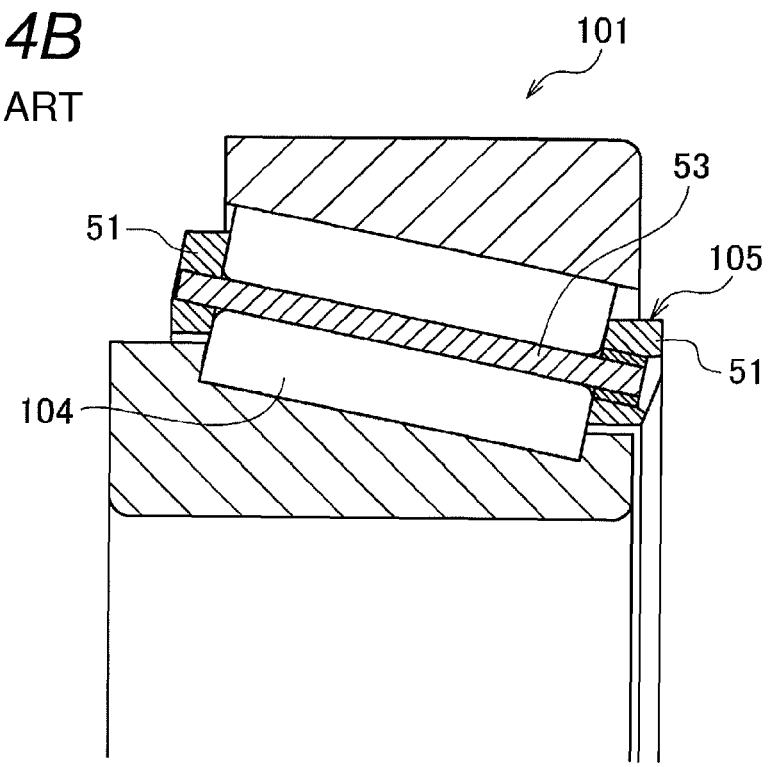
FIG. 4B is an axially cross-sectional view showing the conventional taper roller bearing.

With this configuration of the cage 5A, in comparison with the cage 5 according to the first embodiment, the number of the tapered rollers 4A can be increased further because no pillar sections are provided. Furthermore, like the cage 105 of the conventional taper roller bearing shown in FIG. 4B, in the case that the pair of annular plates 51 is connected to each other using pins 53 passing through tapered rollers 104, if the design of the bearing is attempted so as to satisfy the above-mentioned relational expressions (a1) to (c1), the rollers may be broken. With this embodiment, since the relational expressions (a1) to (c1) are satisfied, the thickness of the inner ring 2 is increased and the rigidity of the inner ring 2 can be raised, whereby the deformation of the inner ring 2 is suppressed, thereby suppressing creep. Furthermore, since the ratio S/dm between the distance S (refer to FIG. 3) between the adjacent tapered rollers and the pitch circle diameter dm is set to satisfy $Dw/dm \leq S/dm \leq 0.11$ and the number of the tapered rollers 4 can be increased, the elastic deformation of the inner ring 2 is suppressed and the creep phenomenon can be suppressed.

Third Embodiment

In the first and second embodiments described above, taper roller bearings are taken as examples of roller bearings being used for outer-ring rotation in the wheels of heavy dump trucks, mine/construction dump trucks, wheel loaders, etc.; however, the present invention is also applicable to cylindrical roller bearings being used for outer-ring rotation in planetary gears for general industrial machinery, etc. In the second embodiment, a cylindrical roller bearing will be described.

Figure 6A:
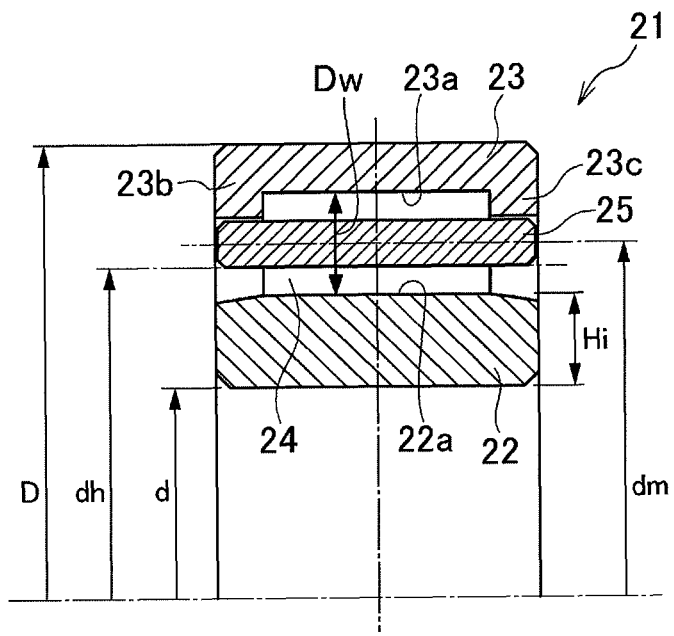
FIG. 6A is an axially cross-sectional view showing a cylindrical roller bearing according to a third embodiment of the present invention.

As shown in FIG. 6A, a cylindrical roller bearing 21 is equipped with an inner ring 22, an outer ring 23, a plurality of cylindrical rollers 24, and a cage 25. The inner ring 22 has an inner ring raceway 22a on the outer peripheral surface thereof, and the outer ring 23 has an outer ring raceway 23a on the inner peripheral surface thereof, and rib sections 23b and 23c on both sides of the outer ring raceway 23a. The plurality of tapered rollers 24 are rotatably provided between the inner ring raceway 22a and the outer ring raceway 23a using the cage 25.

Although an NU-type cylindrical roller bearing is taken as an example in this embodiment, the present invention is applicable, regardless of the presence or absence of the rib sections of various types, such as NJ and NU types. The materials of the cylindrical roller 24 and the cage 25 are similar to those in the first embodiment, and any given types of cages, such as a press-molded cage and a resin-made cage, can be used as the cage 25, without being limited to a machined cage; furthermore, the cage may be omitted as in the case of a full complement roller bearing. Moreover, the cage 5A described in the second embodiment may also be used.

As shown in FIG. 6A, it is herein assumed that the pitch circle diameter of each cylindrical roller 24 is dm, that the thickness of the inner ring is Hi, that the cross-sectional center diameter of the cylindrical roller bearing is dh, and that the diameter of the cylindrical roller 24 is Dw. The diameter of the cylindrical surface obtained by connecting the middle points of the plurality of cylindrical rollers 24 disposed inside the space between the inner ring raceway 22a and the outer ring raceway 23a is referred to as the pitch circle diameter of the cylindrical roller 24, and the pitch circle diameter has the same value, regardless of whether any cylindrical rollers 24 are used. Furthermore, when it is assumed that the inside diameter (the dimension of the inner peripheral diameter of the inner ring) of the cylindrical roller bearing is d and that the outside diameter (the dimension of the outer peripheral diameter of the outer ring) is D, the cross-sectional center diameter dh of the cylindrical roller bearing is represented by $(D+d)/2$.

The cylindrical roller bearing 21 according to this embodiment has been set to satisfy both the following two conditions: (a2) the ratio Hi/Dw between the thickness Hi of the inner ring and the diameter Dw of the roller is $0.6 \leq Hi/Dw \leq 1.8$ and (b2) the ratio dm/dh between the pitch circle diameter dm and the cross-sectional center diameter dh of the cylindrical roller bearing is $1.01 \leq dm/dh \leq 1.15$.

If the ratio Hi/Dw between the thickness Hi of the inner ring and the diameter Dw of the roller is small, the effect of suppressing creep is weak; on the other hand, if the ratio is large, the lowering rate of the bearing life becomes large. Hence, the ratio Hi/Dw between the thickness Hi of the inner ring and the diameter Dw of the roller is preferably $0.8 \leq Hi/Dw \leq 1.5$. Furthermore, for a similar reason, the ratio dm/dh between the pitch circle diameter dm and the cross-sectional center diameter dh of the cylindrical roller bearing is preferably $1.01 \leq dm/dh \leq 1.10$.

Figure 6B:
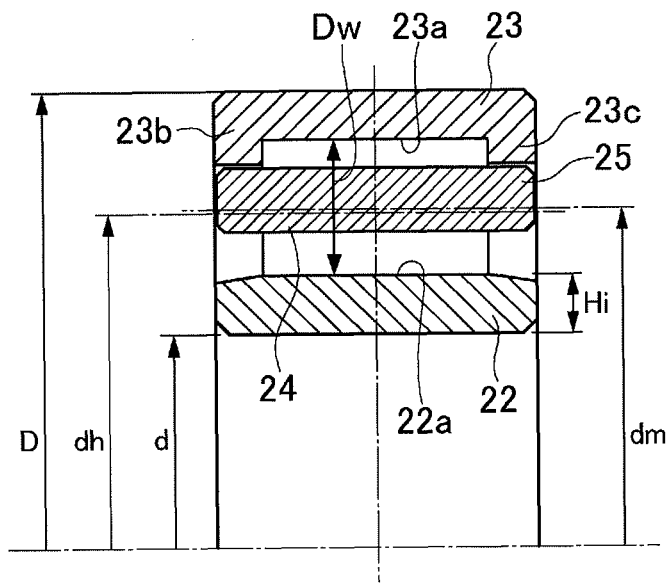
FIG. 6B is an axially cross-sectional view showing the conventional cylindrical roller bearing.

As described above, in the cylindrical roller bearing 21 according to this embodiment, since the diameter of the roller is made smaller than that of the conventional cylindrical roller bearing shown in FIG. 6B and the thickness of the inner ring 22 is increased, the rigidity of the inner ring 22 is raised, whereby the deformation of the inner ring 22 is suppressed, thereby suppressing creep. Still further, since the diameter of the roller is made smaller, the number of the rollers can be increased and the loads on the rolling elements can be reduced, whereby a further creep suppressing effect can be obtained.

Since the diameter of the roller is made smaller, the bearing life becomes shorter; in the case that an appropriate bearing life is desired to be obtained securely, it is preferable that at least the inner ring is made of carbon steel containing 0.1 to 0.7 wt % of carbon and is subjected to carburizing or carbonitriding so that the amount of retained austenite in the surface layer of the raceway is 20 to 45 vol %.

Fourth Embodiment

Next, a spherical roller bearing being used for outer-ring rotation in planetary gears for general industrial machinery, etc. will be described.

Figure 7A:
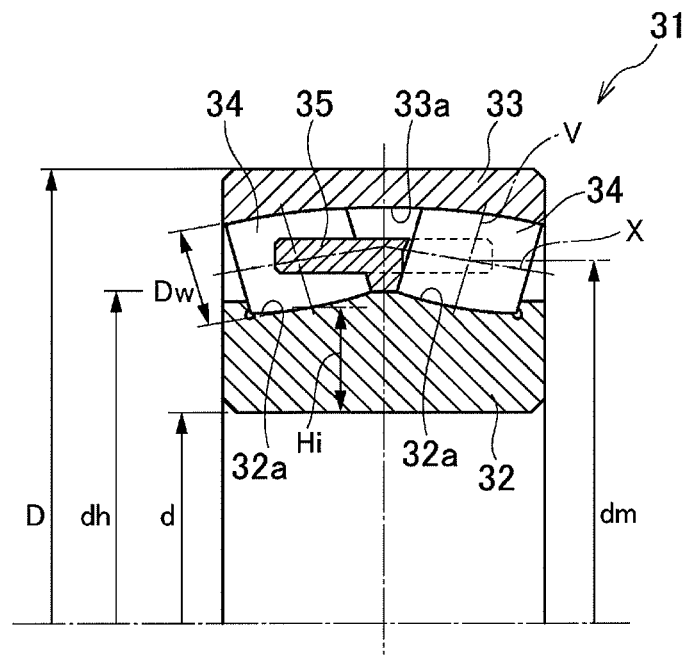
FIG. 7A is an axially cross-sectional view showing a spherical roller bearing according to a fourth embodiment of the present invention.

As shown in FIG. 7A, a spherical roller bearing 31 is equipped with an inner ring 32, an outer ring 33, a plurality of spherical rollers 34, and a cage 35. An outer ring raceway 33a serving as a spherical concave surface having a single center is formed on the inner peripheral surface of the above-mentioned outer ring 33. In addition, a pair of inner ring raceways 32a and 32b respectively opposed to the above-mentioned outer ring raceway 33a is formed on both sides of the outer peripheral surface of the above-mentioned inner ring 32 in the width direction thereof. Furthermore, the above-mentioned plurality of spherical rollers 34, having a beer barrel shape in which the maximum diameter section thereof is present at the middle section of each spherical roller 34 in the axial direction (generally, a symmetrical shape in which the maximum diameter section thereof is formed at the center in the axial direction), are arranged rotatably in two rows between the above-mentioned outer ring raceway 33a and the above-mentioned pair of inner ring raceways 32a and 32b. The spherical rollers 34 configured as described above are provided rotatably using the cage 35.

The materials of the spherical roller 34 and the cage 35 are similar to those in the first embodiment, and any given types of cages, such as a press-molded cage and a resin-made cage, can be used as the cage 35, without being limited to a machined cage.

As shown in FIG. 7A, it is herein assumed that the pitch circle diameter at the center of the roller length along the axis line x of each spherical roller 4 is dm, that the radial dimension of the inner ring 32 at the point where a perpendicular line v extending perpendicularly with respect to the axis line x from the position of the pitch circle diameter intersects with the inner ring raceway 32a is the thickness Hi of the inner ring, and that the cross-sectional center diameter of the spherical roller bearing is dh, and that the maximum diameter dimension of the spherical roller 34 is the diameter Dw of the roller.

The diameter of the cylindrical surface obtained by connecting the middle points of the roller lengths along the axis lines x of the plurality of spherical rollers 34 disposed inside the space between the inner ring raceway 32a and the outer ring raceway 33a is referred to as the pitch circle diameter of the spherical roller 34, and the pitch circle diameter has the same value, regardless of whether any spherical rollers 34 are used. Furthermore, when it is assumed that the inside diameter (the dimension of the inner peripheral diameter of the inner ring) of the spherical roller bearing is d and the outside diameter (the dimension of the outer peripheral diameter of the outer ring) is D, the cross-sectional center diameter dh of the spherical roller bearing is represented by (D+d)/2.

The spherical roller bearing 31 according to this embodiment has been set to satisfy both the following two conditions: (a3) the ratio Hi/Dw between the thickness Hi of the inner ring and the diameter Dw of the roller is 0.8≤Hi/Dw≤2.0 and (b3) the ratio dm/dh between the pitch circle diameter dm and the cross-sectional center diameter dh of the cylindrical roller bearing is 1.01≤dm/dh≤1.15.

If the ratio Hi/Dw between the thickness Hi of the inner ring and the diameter Dw of the roller is small, the effect of suppressing creep is weak; on the other hand, if the ratio is large, the lowering rate of the bearing life becomes large. Hence, the ratio Hi/Dw between the thickness Hi of the inner ring and the diameter Dw of the roller is preferably 1.0 to 1.8. Furthermore, for a similar reason, the ratio dm/dh between the pitch circle diameter dm and the cross-sectional center diameter dh of the cylindrical roller bearing is preferably 1.05 to 1.15.

Figure 7B:
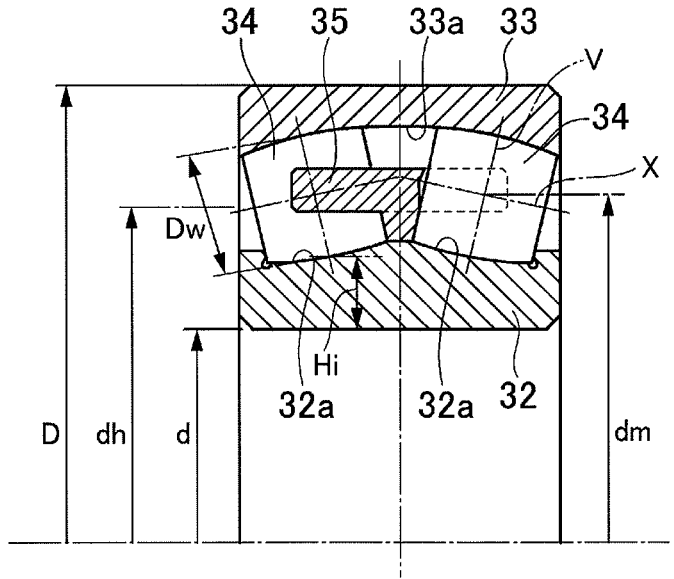
FIG. 7B is an axially cross-sectional view showing the conventional spherical roller bearing.

As described above, in the spherical roller bearing 31 according to this embodiment, since the diameter of the roller is made smaller than that of the conventional spherical roller bearing shown in FIG. 7B and the thickness of the inner ring 32 is increased, the rigidity of the inner ring 32 is raised, whereby the deformation of the inner ring 32 is suppressed, thereby suppressing creep. Still further, since the diameter of the roller is made smaller, the number of the rollers can be increased and the loads on the rolling elements can be reduced, whereby a further creep suppressing effect can be obtained.

Since the diameter of the roller is made smaller, the bearing life becomes shorter; in the case that an appropriate bearing life is desired to be obtained securely, it is preferable that at least the inner ring is made of carbon steel containing 0.1 to 0.7 wt % of carbon and is subjected to carburizing or carbonitriding so that the amount of retained austenite in the surface layer of the raceway is 20 to 45 vol %.

EXAMPLES

The advantage of the present invention will be described below with reference to Examples of the present invention and Comparative Examples.

<Taper Roller Bearing>

Three kinds of taper roller bearings each having an external shape measuring 260 mm in inside diameter, 400 mm in outside diameter and 87 mm in width were prepared. The first one is a standard product conforming to ISO Standard (ISO 355-1977) (for example, Model No. HR32052XJ, NSK, hereinafter referred to as a conventional standard bearing A) serving as Comparative Example 1, the second one is the taper roller bearing disclosed in Patent Document 2 (the thicknesses of the inner ring and the outer ring of the conventional standard bearing A are increased) and serving as Comparative Example 2, and the third one is a taper roller bearing (the thickness of the inner ring of the conventional standard bearing A is increased) serving as Example 1 of the present invention. The bearing rigidity (basic static load rating Cor), creep resistance and bearing life of each of these taper roller bearings were measured.

In the conventional standard bearing A serving as Comparative Example 1, the thickness Hi of the inner ring was 18.9 mm, the diameter Dw of the tapered roller was 34.2 mm, the pitch circle diameter dm was 331 mm, the cross-sectional center diameter dh was 330 mm, the length L of the tapered roller was 64 mm, the number Z of the tapered rollers was 27, the distance S between the adjacent tapered rollers was 38.5 mm, the ratio Hi/Dw between the thickness Hi of the inner ring and the diameter Dw of the tapered roller was 0.6, the ratio dm/dh between the pitch circle diameter dm and the cross-sectional center diameter dh of the taper roller bearing was 1.00, the ratio L/Dw between the length L of the tapered roller and the diameter Dw of the tapered roller was 1.9, and the ratio S/dm between the distance S between the adjacent tapered rollers and the pitch circle diameter dm was 0.12.

In the taper roller bearing described in Patent Document 2 and serving as Comparative Example 2, the thickness Hi of the inner ring was 28.0 mm, the diameter Dw of the tapered roller was 17.5 mm, the pitch circle diameter dm was 333.5 mm, the cross-sectional center diameter dh was 330 mm, the length L of the tapered roller was 52.5 mm, the number Z of the tapered rollers was 53, the distance S between the adjacent tapered rollers was 19.8 mm, the ratio Hi/Dw between the thickness Hi of the inner ring and the diameter Dw of the tapered roller was 1.6, the ratio dm/dh between the pitch circle diameter dm and the cross-sectional center diameter dh of the taper roller bearing was 1.01, the ratio L/Dw between the length L of the tapered roller and the diameter Dw of the tapered roller was 3.0, and the ratio S/dm between the distance S between the adjacent tapered rollers and the pitch circle diameter dm was 0.06.

In the taper roller bearing serving as Example 1, the thickness Hi of the inner ring was 26.8 mm, the diameter Dw of the tapered roller was 25.6 mm, the pitch circle diameter dm was 339 mm, the cross-sectional center diameter dh was 330 mm, the length L of the tapered roller was 64 mm, the number Z of the tapered rollers was 38, the distance S between the adjacent tapered rollers was 28.0 mm, the ratio Hi/Dw between the thickness Hi of the inner ring and the diameter Dw of the tapered roller was 1.0, the ratio dm/dh between the pitch circle diameter dm and the cross-sectional center diameter dh of the taper roller bearing was 1.03, the ratio L/Dw between the length L of the tapered roller and the diameter Dw of the tapered roller was 2.5, and the ratio S/dm between the distance S between the adjacent tapered rollers and the pitch circle diameter dm was 0.08

The external shapes of the above-mentioned three kinds of taper roller bearings are summarized in Table 1 below.

TABLE 1

|  | Comparative Example 1 (Conventional standard bearing A) | Comparative Example 2 (Patent Document 2) | Example 1 (Present invention) |
|---|---|---|---|
| Thickness Hi of inner ring (mm) | 18.9 | 28.0 | 26.8 |
| Diameter Dw of tapered roller (mm) | 34.2 | 17.5 | 25.6 |
| Pitch circle diameter dm (mm) | 331 | 333.5 | 339 |
| Cross-sectional center diameter dh (mm) | 330 | 330 | 330 |
| Length L of tapered roller (mm) | 64 | 52.5 | 64 |
| Number N of tapered rollers | 27 | 53 | 38 |
| Distance S between rollers (mm) | 38.5 | 19.8 | 28.0 |
| Hi/Dw | 0.6 | 1.6 | 1.0 |
| dm/dh | 1.00 | 1.01 | 1.03 |
| L/Dw | 1.9 | 3.0 | 2.5 |
| S/dm | 0.12 | 0.06 | 0.08 |

In the above-mentioned three kinds of taper roller bearings, the bearing rigidity (basic static load rating Cor) was obtained using the following calculation expression (2).

$$Cor = f_o \cdot i \cdot Z \cdot Dw \cdot L \cdot \cos \alpha \quad (2)$$

wherein fo is a coefficient, i is the number of the rows of the rolling elements, Z is the number of the rolling elements, Dw is the diameter of the tapered roller, L is the length of the tapered roller, and α is the contact angle of the outer ring.

The bearing rigidity (basic static load rating Cor) and the evaluation thereof are shown in Table 2. The bearing rigidity was evaluated such that if the rigidity was larger than that of the bearing used as the standard (the conventional standard bearing A serving as Comparative Example 1 in Examples), the requirement was satisfied (○), and if the rigidity was smaller, the requirement was not satisfied (x) (also in Tables 5 and 7 below, judgments were made on the basis of similar standards in comparison with the respective comparative examples.)

TABLE 2

|  | Comparative Example 1 (Conventional standard bearing A) | Comparative Example 2 (Patent Document 2) | Example 1 (Present invention) |
|---|---|---|---|
| Bearing rigidity (Basic static load rating Cor) | 1 | 0.85 | 1.1 |
| Evaluation of bearing rigidity | — | x | ○ |

In the case that the basic static load rating Cor was calculated under the above-mentioned conditions, when it is assumed that the basic static load rating Cor of the tapered roller bearing, i.e., the conventional standard bearing A serving as Comparative Example 1, is 1, the basic static load rating Cor of the taper roller bearing serving as Example 1 is approximately 1.1, and it can be confirmed that the rigidity is raised. Furthermore, in the taper roller bearing described in Patent Document 2 and serving as Comparative Example 2, the basic static load rating Cor is 0.85; hence, it is found that the basic static load rating Cor of the taper roller bearing serving as Example 1 is larger than that of the taper roller bearing described in Patent Document 2 and serving as Comparative Example 2.

In the taper roller bearing serving as Example 1, since the thickness of the inner ring is made larger than that of the inner ring of the conventional standard bearing A serving as Comparative Example 1, the rigidity of the inner ring was raised. Furthermore, in the taper roller bearing described in Patent Document 2 and serving as Comparative Example 2, since the thicknesses of the inner ring and the outer ring are made larger than those of the inner ring and the outer ring of the conventional standard bearing A serving as the Comparative Example 1, the diameter of the roller is made extremely smaller, and the length of the roller is made shorter accordingly, whereby the basic static load rating Cor is made smaller than that of the conventional standard bearing A serving as Comparative Example 1. As a result, in the taper roller bearing serving as Example 1, the basic static load rating Cor is larger than those of the conventional standard bearing A serving as Comparative Example 1 and conforming to the ISO standard and the taper roller bearing described in Patent Document 2 and serving as Comparative Example 2.

Next, creep resistance will be described. Creep resistance was evaluated on the basis of a creep generation load at which creep is generated on the inner ring In the taper roller bearing serving as Example 1, the creep resistance of the inner ring is eight or more times the creep resistance in the conventional standard bearing A serving as Comparative Example 1; in the taper roller bearing described in Patent Document 2 and serving as Comparative Example 2, the creep resistance is three times the creep resistance in the conventional standard bearing A serving as Comparative Example 1. It is thus found that the creep resistance in the taper roller bearing serving as Example 1 is higher than that in the taper roller bearing described in Patent Document 2 and serving as Comparative Example 2.

In the taper roller bearing serving as Example 1, since the basic static load rating is increased and the rigidity of the inner ring is raised, the deformation of the inner ring is suppressed and the creep phenomenon is suppressed. Moreover, since the number of the rolling elements is increased and the distance between the rollers is reduced in comparison with the conventional standard bearing A serving as Comparative Example 1, the load on each tapered roller is decreased. As a result, the surface pressure on the surface of the inner ring raceway is reduced and the elastic deformation of the inner ring is suppressed, whereby the creep phenomenon is further suppressed. Still further, since the distance between the rollers is reduced, the elongations on the surface of the inner ring raceway in the circumferential direction due to the loads on the rolling elements are cancelled with each other, and the creep phenomenon can be suppressed.

In the taper roller bearing described in Patent Document 2 and serving as Comparative Example 2, since the diameter of the roller and the length of the roller are extremely small, the surface pressure on the surface of the inner ring raceway is increased; as a result, the creep resistance is inferior to that in the taper roller bearing serving as Example 1 of the present invention.

Next, the bearing life and the evaluation thereof are shown in Table 3. This table shows the ratios obtained in the case that the value of the bearing life of the conventional standard bearing A serving as Comparative Example 1 is 1. The bearing life was evaluated such that if the bearing life was 0.5 or more of the bearing life of the bearing (the conventional standard bearing A serving as Comparative Example 1 in Examples) used as the standard, the requirement was satisfied (○), and if the bearing life was less than 0.5, the requirement was not satisfied (x) (also in Tables 5 and 7 below, judgments were made on the basis of similar standards in comparison with the respective comparative examples.)

TABLE 3

| | Comparative Example 1 (Conventional standard bearing A) | Comparative Example 2 (Patent Document 2) | Example 1 (Present invention) |
|---|---|---|---|
| Bearing life | 1 | 0.2 | 0.7 |
| Evaluation of bearing life | — | x | ○ |

In the taper roller bearing serving as Example 1, the bearing life was 0.7 in comparison with that of the conventional standard bearing A serving as Comparative Example 1, and in the taper roller bearing described in Patent Document 2 and serving as Comparative Example 2, the bearing life was 0.2 in comparison with that of the conventional standard bearing A serving as Comparative Example 1. The bearing life of the taper roller bearing serving as Example 1 is longer than that of the taper roller bearing described in Patent Document 2 and serving as Comparative Example 2, but shorter than that of the conventional standard bearing A serving as Comparative Example 1 because the diameter of the roller is made smaller; however, the lowering rate of the life is suppressed to approximately 30% of the life of the conventional standard bearing A serving as Comparative Example 1.

With respect to the lowering of the life, in the case that the inner ring made of carbon steel containing 0.1 to 0.7 wt % of carbon was subjected to carburizing or carbonitriding so that the amount of retained austenite in the surface layer of the raceway was 20 to 45 vol %, the bearing life was able to be increased to 1.4.

In the case that a roller bearing is used for an outer-ring rotation load, it is known that the surface pressure on the surface of the inner ring raceway is high and that flaking occurs on the inner ring that is subjecting to repeated stress as the rollers pass. In addition, in particular, in a mine dump truck, foreign matter enters from the outside. The foreign matter damages the raceway surfaces of the roller bearing and lowers the life of the roller bearing. Hence, in the case that at least the inner ring is made of carbon steel containing 0.1 to 0.7 wt % of carbon and is subjected to carburizing or carbonitriding so that the amount of retained austenite in the surface layer of the raceway is 20 to 45 vol %, the bearing life can be made equal to or more than that of the conventional standard bearing A. However, if the amount of retained austenite is more than 45%, the fatigue resistance is conversely lowered because the surface hardness is lowered.

As described above, in the case of the present invention, in comparison with the conventional standard bearing A serving as Comparative Example 1, only the thickness of the inner ring is made larger without making the thickness of the outer ring larger; in this respect, the taper roller bearing of the present invention is significantly different from the taper roller bearing described in Patent Document 2 and serving as Comparative Example 2. In the roller bearings to be used under outer-ring rotation conditions in the wheels of trucks, mine/construction dump trucks, wheel loaders, etc., since tight fit is usually used for the fitting of the outer ring, the creep phenomenon of the outer ring is weaker that that of the inner ring. For this reason, the present inventors have found that the creep phenomenon of the inner ring can be prevented by increasing the thickness of the inner ring without increasing the thickness of the outer ring. Furthermore, the inventors have found that the surface pressure on the surface of the outer ring raceway is lowered by increasing the number of the rolling elements and by lowering the loads on the rolling elements and that the creep phenomenon of the outer ring can be prevented by making the adjacent rolling elements closer to each other so that the elongations on the surface of the outer ring raceway in the circumferential direction due to the loads on the rolling elements are cancelled. Moreover, since the thickness of the outer ring is not increased, the diameter of the roller can be increased accordingly; as a result, the lowering of the bearing life can be minimized, and the rigidity of the bearing can be made larger than that of the conventional standard bearing A serving as Comparative Example 1.

<Cylindrical Roller Bearing>

Two kinds of cylindrical roller bearings each having an external shape measuring 100 mm in inside diameter, 215 mm in outside diameter and 73 mm in width were prepared.

In a conventional standard bearing B (a standard product conforming to JIS B1533-1993) serving as Comparative Example 3, the thickness Hi of the inner ring was 13.8 mm, the diameter Dw of the roller was 32.0 mm, the pitch circle diameter dm was 159.5 mm, the cross-sectional center diameter dh was 157.5 mm, the length L of the roller was 52 mm, the number Z of the rollers was 13, the ratio Hi/Dw between the thickness Hi of the inner ring and the diameter Dw of the roller was 0.43, and the ratio dm/dh between the pitch circle diameter dm and the cross-sectional center diameter dh of the cylindrical roller bearing was 1.01.

In a cylindrical roller bearing serving as Example 2 of the present invention, the thickness Hi of the inner ring was 25.8 mm, the diameter Dw of the roller was 22.0 mm, the pitch circle diameter dm was 171.5 mm, the cross-sectional center diameter dh was 157.5 mm, the length L of the roller was 52 mm, the number Z of the rollers was 22, the ratio Hi/Dw between the thickness Hi of the inner ring and the diameter Dw of the roller was 1.29, and the ratio dm/dh between the pitch circle diameter dm and the cross-sectional center diameter dh of the cylindrical roller bearing was 1.09.

The external shapes of the above-mentioned two kinds of cylindrical roller bearings are summarized in Table 4 below.

TABLE 4

| | Comparative Example 3 (Conventional standard bearing B) | Example 2 (Present invention) |
|---|---|---|
| Thickness Hi of inner ring (mm) | 13.8 | 25.8 |
| Diameter Dw of roller (mm) | 32.0 | 20.0 |
| Pitch circle diameter dm (mm) | 159.5 | 171.5 |
| Cross-sectional center diameter dh (mm) | 157.5 | 157.5 |
| Length L of roller (mm) | 52 | 52 |
| Number N of rollers | 13 | 22 |
| Hi/Dw | 0.43 | 1.29 |
| dm/dh | 1.01 | 1.09 |

In the above-mentioned two kinds of cylindrical roller bearings, the basic static load rating Cor was obtained using the above-mentioned calculation expression (2). In addition, the bearing life was also measured.

The result and the evaluation thereof are shown in Table 5.

TABLE 5

|  | Comparative Example 3 (Conventional standard bearing B) | Example 2 (Present invention) |
|---|---|---|
| Bearing rigidity (Basic static load rating Cor) | 1 | 1.2 |
| Evaluation of bearing rigidity | — | ○ |
| Bearing life | 1 | 0.6 |
| Evaluation of bearing life | — | ○ |

In the case that the basic static load rating Cor was calculated under the above-mentioned conditions, when it is assumed that the basic static load rating Cor of the cylindrical roller bearing, i.e., the conventional standard bearing B serving as Comparative Example 3, is 1, the basic static load rating Cor of the cylindrical roller bearing serving as Example 2 is approximately 1.2, and it can be confirmed that the rigidity is increased. Furthermore, in the cylindrical roller bearing serving as Example 2, the bearing life was lowered to 0.6 in comparison with that of the conventional standard bearing B serving as Comparative Example 3. With respect to the lowering of the life, in the case that the inner ring made of carbon steel containing 0.1 to 0.7 wt % of carbon was subjected to carburizing or carbonitriding so that the amount of retained austenite in the surface layer of the raceway was 20 to 45 vol %, the bearing life was able to be increased to 1.2.

As described above, also in the case of this embodiment, the creep phenomenon of the inner ring can be prevented by increasing the thickness of the inner ring without increasing the thickness of the outer ring; furthermore, the creep phenomenon of the inner ring can be prevented more securely by increasing the number of the rolling elements to lower the loads on the rolling elements and by making the adjacent rolling elements closer to each other so that the elongations on the surface of the inner ring raceway in the circumferential direction due to the loads on the rolling elements are cancelled.

<Spherical Roller Bearing>

Two kinds of spherical roller bearings each having an external shape measuring 100 mm in inside diameter, 215 mm in outside diameter and 73 mm in width were prepared.

In a conventional standard bearing C (a standard product conforming to JIS B1535-1993) serving as Comparative Example 4, the thickness Hi of the inner ring was 17.2 mm, the diameter Dw of the roller was 29.0 mm, the pitch circle diameter dm was 162.5 mm, the cross-sectional center diameter dh was 157.5 mm, the length L of the roller was 27.3 mm, the number Z of the rollers was 15, the ratio Hi/Dw between the thickness Hi of the inner ring and the diameter Dw of the roller was 0.60, and the ratio dm/dh between the pitch circle diameter dm and the cross-sectional center diameter dh of the spherical roller bearing was 1.03.

In a spherical roller bearing serving as Example 3 of the present invention, the thickness Hi of the inner ring was 28.7 mm, the diameter Dw of the roller was 17.0 mm, the pitch circle diameter dm was 173.9 mm, the cross-sectional center diameter dh was 157.5 mm, the length L of the roller was 27.3, the number Z of the rollers was 27, the ratio Hi/Dw between the thickness Hi of the inner ring and the diameter Dw of the roller was 1.68, and the ratio dm/dh between the pitch circle diameter dm and the cross-sectional center diameter dh of the spherical roller bearing was 1.10.

The external shapes of the above-mentioned two kinds of spherical roller bearings are summarized in Table 6 below.

TABLE 6

|  | Comparative Example 4 (Conventional standard bearing C) | Example 3 (Present invention) |
|---|---|---|
| Thickness Hi of inner ring (mm) | 17.2 | 28.7 |
| Diameter Dw of roller (mm) | 29.0 | 17.0 |
| Pitch circle diameter dm (mm) | 162.5 | 173.9 |
| Cross-sectional center diameter dh (mm) | 157.5 | 157.5 |
| Length L of roller (mm) | 27.3 | 27.3 |
| Number N of rollers | 15 | 27 |
| Hi/Dw | 0.60 | 1.68 |
| dm/dh | 1.03 | 1.10 |

In the above-mentioned two kinds of spherical roller bearings, the basic static load rating Cor was obtained using the above-mentioned calculation expression (2). In addition, the bearing life was also measured.

The result and the evaluation thereof are shown in Table 7.

TABLE 7

|  | Comparative Example 4 (Conventional standard bearing C) | Example 3 (Present invention) |
|---|---|---|
| Bearing rigidity (Basic static load rating Cor) | 1 | 1.2 |
| Evaluation of bearing rigidity | — | ○ |
| Bearing life | 1 | 0.6 |
| Evaluation of bearing life | — | ○ |

In the case that the basic static load rating Cor was calculated under the above-mentioned conditions, when it is assumed that the basic static load rating Cor of the spherical roller bearing serving, i.e., the conventional standard bearing C serving as Comparative Example 4, is 1, the basic static load rating Cor of the spherical roller bearing serving as Example 3 is approximately 1.2, and it can be confirmed that the rigidity is increased. Furthermore, in the spherical roller bearing serving as Example 3, the bearing life was lowered to 0.6 in comparison with that of the conventional standard bearing C serving as Comparative Example 4. With respect to the lowering of the life, in the case that the inner ring made of carbon steel containing 0.1 to 0.7 wt % of carbon was subjected to carburizing or carbonitriding so that the amount of retained austenite in the surface layer of the raceway was 20 to 45 vol %, the bearing life was able to be increased to 1.2.

As described above, also in the case of this embodiment, the creep phenomenon of the inner ring can be prevented by increasing the thickness of the inner ring without increasing the thickness of the outer ring; furthermore, the creep phenomenon of the inner ring can be prevented more securely by increasing the number of the rolling elements to lower the loads on the rolling elements and by making the adjacent rolling elements closer to each other so that the elongations on the surface of the inner ring raceway in the circumferential direction due to the loads on the rolling elements are cancelled.

Still further, the creep phenomenon may be suppressed securely by increasing the surface roughness of the inner peripheral surfaces of the inner rings 2, 22 and 32 and the surface roughness of the outer peripheral surfaces of the outer rings 3, 23 and 33 and by increasing the friction coefficients thereof. Alternatively, a solid lubrication film or an oil repellent film may be coated on the inner peripheral surfaces of the inner rings 2, 22 and 32 using micro shot or the like.

The present invention is not limited to the above-mentioned embodiments, but can be modified or improved appropriately.

This application is based upon Japanese Patent Application (No. 2011-156750) and Japanese Patent Application (No. 2011-156751) filed on Jul. 15, 2011 and Japanese Patent Application (No. 2012-126481) filed on Jun. 1, 2012, the entire contents of which are incorporated herein by reference.

DESCRIPTION OF REFERENCE NUMERALS AND SIGNS 1 taper roller bearing
2 inner ring
2a inner ring raceway
3 outer ring
3a outer ring raceway
4 tapered roller

The invention claimed is:

1. A roller bearing being used for outer-ring rotation, comprising:
an inner ring having a tapered inner ring raceway on an outer peripheral surface thereof;
an outer ring having a tapered outer ring raceway on an inner peripheral surface thereof; and
a plurality of tapered rollers rotatably provided between the inner ring raceway and the outer ring raceway,
wherein the roller bearing satisfies the following three conditions:

$$0.8 \leq Hi/Dw \leq 1.2, \tag{a1}$$

$$1.01 \leq dm/dh \leq 1.05, \text{ and} \tag{b1}$$

$$2.1 \leq L/Dw \leq 3.0, \tag{c1}$$

where a pitch circle diameter of the tapered rollers at a center of a roller length of each tapered roller along an axis line of each tapered roller is dm,
the radial thickness of the inner ring at an intersection of the inner ring raceway and a perpendicular line extending from a position of the center in a direction perpendicular to the axis line is Hi,
a cross-sectional center diameter of the roller bearing is dh, the length of the tapered roller is L, and
a half of the sum of the large diameter dimension and the small diameter dimension of the tapered roller is Dw,
wherein the three conditions satisfied by the roller bearing are configured to suppress creep of the roller bearing.

2. The roller bearing according to claim 1, wherein the roller bearing further satisfies a condition represented by $Dw/dm \leq S/dm \leq 0.11$,
where a distance between the adjacent tapered rollers is S.

3. The roller bearing according to claim 1, wherein
at least the inner ring is subjected to carburizing or carbonitriding, and
the inner ring is made of carbon steel containing 0.1 to 0.7 wt % of carbon and the amount of retained austenite in a surface layer of the inner ring raceway is 20 to 45 vol %.

4. The roller bearing according to claim 1, further comprising:
a pair of annular plates disposed so as to sandwich the tapered rollers in a longitudinal direction of the tapered rollers; and
a connection member for connecting the pair of annular plates,
wherein
each of the tapered roller has dents at centers of both end faces thereof, and
the pair of annular plates has pins which are fitted into the dents of the end faces of each tapered roller so as not to interrupt the rotation of each tapered roller.

5. The roller bearing according to claim 1, wherein the roller bearing satisfies the following conditions:

$$1.0 \leq Hi/Dw \leq 1.2, \text{ and} \tag{a1}$$

$$1.03 \leq dm/dh \leq 1.05. \tag{b1}$$

6. The roller bearing according to claim 1, wherein the roller bearing satisfies the following conditions:

$$1.0 \leq Hi/Dw \leq 1.2, \tag{a1}$$

$$1.03 \leq dm/dh \leq 1.05, \text{ and} \tag{b1}$$

$$2.5 \leq L/Dw \leq 3.0. \tag{c1}$$

* * * * *